July 10, 1928.

C. A. CARLSON

WINDSHIELD WIPER 1,677,018

Filed Jan. 31, 1927

INVENTOR
Carl August Carlson
BY
White, Prost & Fryer
his ATTORNEYS

Patented July 10, 1928.

UNITED STATES PATENT OFFICE.

CARL A. CARLSON, OF SAN FRANCISCO, CALIFORNIA.

WINDSHIELD WIPER.

Application filed January 31, 1927. Serial No. 164,724.

My invention relates to windshield wipers for vehicles and especially to such wipers which are operated by power derived from the vehicle.

Windshield wipers which are now in general use usually comprise a squeegee oscillated about a pivot point by a suitable motive unit to clear an arcuate segment of windshield. The area of the windshield which is wiped by these devices is relatively small and the remaining uncleared portion is of such an extent as to curtail materially the field of vision.

An object of my invention is to provide a windshield wiper which is effective to wipe the entire windshield.

Another object of my invention is to provide a windshield wiper which can be operated by the same motive unit as wipers now on the market.

Another object of my invention is to provide a windshield wiper which can be alternatively operated by power or by hand.

My invention possesses other advantageous features, some of which with the foregoing, will be set forth at length in the following description where I shall outline in full that form of the windshield wiper of my invention, which I have selected for illustration in the drawings accompanying and forming part of the present specification. In said drawings I have shown one form of windshield wiper embodying my invention, but it is to be understood that I do not limit myself to such form since the invention, as set forth in the claims, may be embodied in a plurality of forms.

Figure 1:
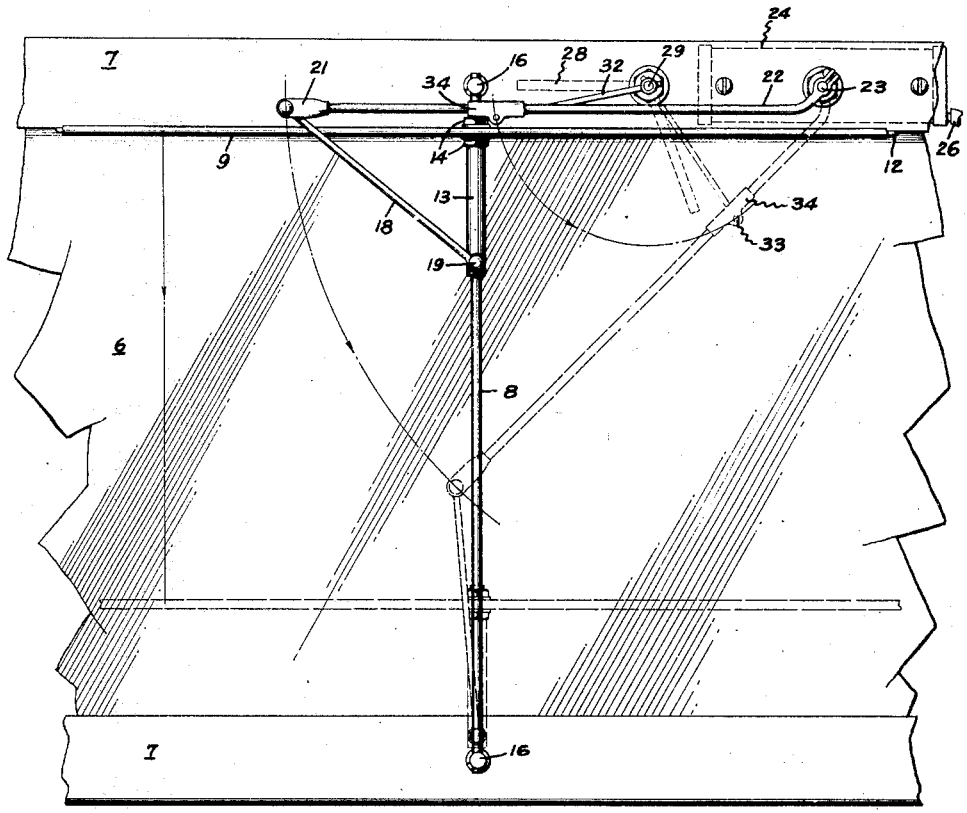
Fig. 1 is a front elevation of a portion of a windshield equipped with the wiper of my invention.
Figure 2:
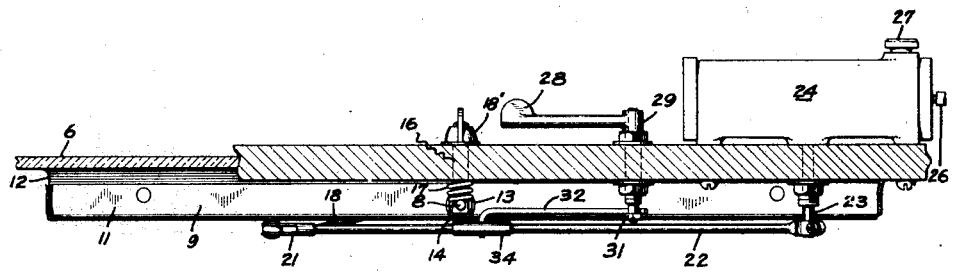
Fig. 2 is a plan view of my windshield wiper as it is installed on a windshield.

The windshield wiper of my invention preferably comprises a squeegee constrained to translational movement and driven thru suitable linkage from a shaft which is rotatably oscillable.

I preferably install my windshield wiper upon a vehicle in which the windshield 6 is mounted in a surrounding frame 7. A vertical guide 8 is provided intermediate the sides of the windshield for constraining the motion of a squeegee 9 of the usual kind comprising a metallic channel 11 in which a strip of rubber 12 or other suitable material is firmly fastened. The channel is apertured adjacent its center and fits over a sleeve 13 slidably mounted on the guide 8 and is held on the sleeve by means of a pair of jam nuts 14.

In order that the squeegee can be adjusted toward or away from the windshield 6 to give the best results, the guide 8 is made movable with respect to the windshield. At each end, the guide passes thru the apertured end of a threaded stud 16 piercing the windshield frame 7. Interposed between the guide and the windshield frame and surrounding the stud 16, is a coil spring 17. On the inner, threaded end of the stud, a wing nut 18' is provided which, by rotational movement adjusts the spacing of the guide and the windshield, thereby correctly positioning the squeegee.

Means are provided for giving the squeegee 9 translatory movement on the vertical guide 8. A link 18 is connected at one end to a pivot 19 secured to the sleeve 13, and at its other end is pivoted between the forked end 21 of a crank 22. The opposite end of the crank grips frictionally a shaft 23 extending thru the windshield frame 7. The shaft 23 is preferably the extended shaft of a motive unit 24 for a windshield wiper of the ordinary type. The motive unit can be of any desired kind and preferably operates either by vacuum or by electricity available on the vehicle. In the drawings I have shown a motive unit operating by vacuum transmitted thereto thru the conduit 26. A control 27 is provided for regulating the operation of the unit 24.

When the motive unit 24 is energized the shaft 23 is rotatably oscillated and rocks the crank 22 in an arcuate path. Thru the medium of the link 18, the crank reciprocates the sleeve 13 upon the constraining guide 8 and the squeegee 9 is therefore given a translatory movement over substantially the entire surface of the windshield.

Instead of connecting the shaft 23 to a motive unit 24, I may simply journal it in the windshield frame and provide means for actuating the wiper by hand. As a further variation, the motive unit 24 may be connected as described and a hand actuating device can be provided in addition thereto. The hand actuator preferably comprises a handle 28 which is journalled in the windshield frame by a shaft 29. A lock nut 31 holds a crank 32 in place in an aperture extending thru the projecting portion of the shaft. At its opposite end, the crank 32 is bent over and passes thru a perforation 33 in a sleeve 34 slidably mounted on the crank 22. Oscillation of the handle 28 in a rotary path, correspondingly oscillates the crank 32 and causes the sleeve 34 to slide axially along the crank 22 and rock it in an arcuate path in the same manner as before described. Instead of providing the handle 28 on the shaft 29, I can substitute for it the motive unit 24 and secure the handle to the shaft 23 from which the unit 24 has been removed.

It will be appreciated that I have provided a windshield wiper which is effective to clear an entire windshield and which can be operated manually or by power or by both means. The wiper is also adjustable with respect to the windshield so that any desired pressure of the squeegee can be had to afford a good cleaning effect with a small consumption of power.

I claim:

1. A windshield wiper comprising a squeegee, means for constraining said squeegee to translatory motion, a crank constrained to rotary oscillation, and a link pivoted to said crank and said squeegee.

2. A windshield wiper comprising a squeegee, means for constraining said squeegee to translatory movement, a shaft adapted for rotary oscillation, a crank on said shaft, and a link pivoted to said crank to said squeegee.

3. A windshield wiper comprising a guide, a squeegee mounted on said guide, a crank adapted for rotary oscillation, a link pivoted to said crank to said squeegee, a slide on said crank, and a second crank for operating said slide.

4. A windshield wiper for use on a windshield having a frame, comprising a guide secured to said frame and adjustably mounted thereon, a squeegee slidably mounted on said guide, a crank pivotally secured to said frame, a link pivoted at both ends for connecting said crank to said squeegee, a slide on said crank, and a second crank pivoted to said frame and secured to said slide.

5. A windshield wiper comprising a guide, a squeegee mounted on a sleeve running on said guide, a shaft, means for oscillating said shaft, a crank on said shaft, and a link pivoted to said crank and to said sleeve for translating said squeegee upon oscillation of said shaft.

In testimony whereof, I have hereunto set my hand.

CARL A. CARLSON.